US006259822B1

(12) United States Patent
Hamilton, Jr. et al.

(10) Patent No.: US 6,259,822 B1
(45) Date of Patent: Jul. 10, 2001

(54) EDGE ENHANCEMENT WHICH REDUCES THE VISIBILITY OF FALSE CONTOURS

(75) Inventors: John F. Hamilton, Jr.; James E. Adams, Jr., both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/183,147

(22) Filed: Oct. 30, 1998

(51) Int. Cl.$^7$ .................................................. G29G 5/02
(52) U.S. Cl. ............................................ 382/266; 382/260
(58) Field of Search ................................. 382/199, 266–269, 382/260–265

(56) References Cited

U.S. PATENT DOCUMENTS

| 4,503,461 | * | 3/1985 | Nishimura | 358/111 |
| 5,528,698 | * | 6/1996 | Kamei et al. | 382/100 |
| 5,551,428 | * | 9/1996 | Godlewski et al. | 128/653.1 |
| 5,966,134 | * | 10/1999 | Arias | 345/431 |

* cited by examiner

Primary Examiner—Thomas D. Lee
Assistant Examiner—Stephen Brinich
(74) Attorney, Agent, or Firm—Raymond L. Owens

(57) ABSTRACT

A method of edge enhancing a digital image having pixels which reduces the visibility of false edge contours and includes acquiring a digital image; computing an edge boost record having positive and negative boost values for different portions of the edge regions in a digital image; modifying the edge boost record by applying an adaptive blur kernel to the pixels of such edge boost record; and applying the modified edge boost record to the digital image to provide an edge enhanced digital image which reduces the visibility of false edge contours.

5 Claims, 5 Drawing Sheets

FIG. 2A
(Prior Art)

| -1 | -1 | -1 |
|----|----|----|
| -1 | 8  | -1 |
| -1 | -1 | -1 |

FIG. 2B
(Prior Art)

| -1 | 0 | -1 | 0 | -1 |
|----|---|----|---|----|
| 0  | 0 | 0  | 0 | 0  |
| -1 | 0 | 8  | 0 | -1 |
| 0  | 0 | 0  | 0 | 0  |
| -1 | 0 | -1 | 0 | -1 |

FIG. 2C
(Prior Art)

| -1 | -1 | -1 | -1 | -1 |
|----|----|----|----|----|
| -1 | 0  | 0  | 0  | -1 |
| -1 | 0  | 16 | 0  | -1 |
| -1 | 0  | 0  | 0  | -1 |
| -1 | -1 | -1 | -1 | -1 |

EDGE ENHANCEMENT WHICH REDUCES THE VISIBILITY OF FALSE CONTOURS

CROSS REFERENCE TO RELATED APPLICATIONS

Reference is made to commonly assigned U.S. patent application Ser. No. 09/156,480 filed Sep. 18, 1998, entitled "Edge Enhancement Using Modified Edge Boost Function" to Hamilton et al., the disclosure of which is incorporated herein by reference.

FIELD OF THE INVENTION

This invention relates to edge enhancing digital images such that the visibility of false edge contours is reduced.

BACKGROUND OF THE INVENTION

Currently, digital images are derived through various devices including digital cameras and scanners for digitally scanning of film images. Many times the sharpness of an image is degraded by optical elements or by irregularities in the image sensor. For these reasons, it is often desirable to sharpen an image after it has been converted to a digital form. Conventional sharpening methods, such as unsharp masking, achieve the appearance of edge sharpening by locally lightening the lighter portion of an edge region and locally darkening the darker portion of an edge region. The resulting increase in contrast provides the sharpening effect. Such methods can be applied to black and white digital images as well as to colored digital images.

Shown in FIG. 1A is a one-dimensional edge profile, which is a graph of image pixel code values plotted as a function of their position on a line running perpendicularly across an edge feature in a digital image. Higher code values correspond to lighter shades and lower code values to darker shades. In FIG. 1B, the same edge profile has been further blurred in accordance with the prior art technique of unsharp masking. The curve in FIG. 1B is subtracted from the curve in FIG. 1A and the resulting curve shown in FIG. 1C in which the amplitudes P and N, for positive and negative boost respectively, are approximately the same size. The difference curve of FIG. 1C is added to the original curve in FIG. 1A and this final curve, shown in FIG. 1D, depicts the profile of the sharpened edge. Although unsharp masking was originally a film technique, it also has a digital version. Shown in FIGS. 2A–C are examples of boost kernels which, when applied to a digital image, directly produce boost values analogous to those shown in FIG. 1C and sharpened edges analogous to those shown in FIG. 1D and shows the true edge contour, labeled (T), and the two false contours, labeled (F). The light and dark ridges are labeled (L) and (D) respectively.

When these conventional sharpening methods are applied too aggressively, image artifacts will appear. One recurring artifact is a false secondary edge contour which runs parallel to the true edge. This artifact can often be seen on both the lighter and darker sides of an edge that has been enhanced. The cause of the false contours for a single color channel is shown in FIG. 3 using a one dimensional edge profile. The enhanced edge profile follows the profile of FIG. 1D and shows the true edge contour, labeled (T), and the two false contours, labeled (F). The light and dark ridges are labeled (L) and (D), respectively.

SUMMARY OF THE INVENTION

It is an object of the present invention to provide a method of edge enhancing digital images which reduces the visibility of false contour image artifacts caused by conventional sharpening methods.

This object is achieved by a method of edge enhancing a digital image having pixels which reduces the visibility of false edge contours, comprising the steps of:
 a) acquiring a digital image;
 b) computing an edge boost record having positive and negative boost values for different portions of the edge regions in a digital image;
 c) modifying the edge boost record by applying an adaptive blur kernel to the pixels of such edge boost record; and
 d) applying the modified edge boost record to the digital image to provide an edge enhanced digital image which has reduced visibility of false edge contours.

ADVANTAGES

Digital images are often in need of sharpening and conventional sharpening often produces false contours near edge regions. The present invention reduces the visibility of such false contours by lowering their contrast while maintaining the enhanced contrast of the true edge. This is accomplished by applying an adaptive blue kernel to the edge boost record which reduces the contrast of only the false contour regions. In this way, the enhancement of the true edge remains unchanged, but the false contours are rendered either invisible or with reduced visibility. An additional benefit is that the influence of image noise is reduced in the edge boost record. This provides a greater degree of artifact-free edge enhancement for digital images.

BRIEF DESCRIPTION OF THE DRAWINGS

FIGS. 2A–2C depict prior art boost kernels for producing positive and negative boosts;

DETAILED DESCRIPTION OF THE INVENTION

Figure 4:
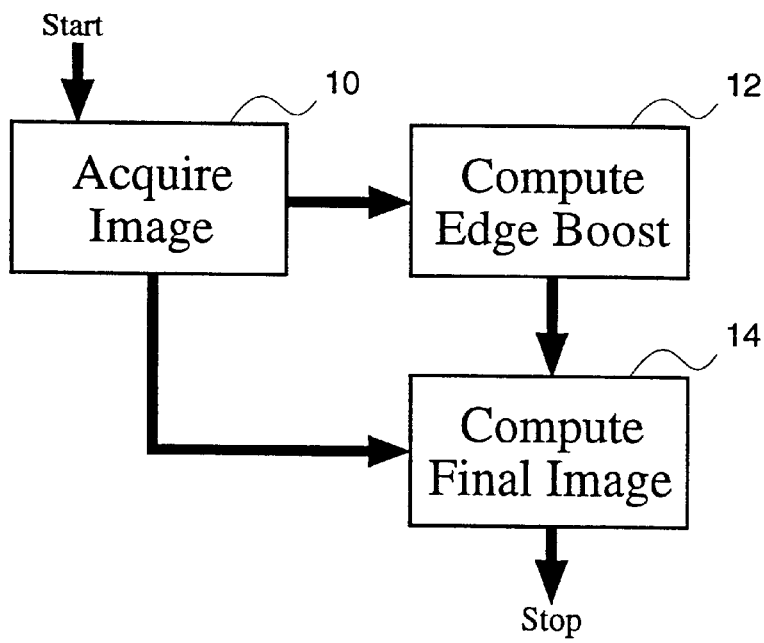
FIG. 4 shows, in block diagram form, the method of the present invention.

Referring to FIG. 4, the process of sharpening an image starts with the acquire image block 10 in which a digital image is obtained by conventional means such as scanning photographic film or direct capture by electronic camera. In the compute edge boost block 12, an edge boost record is derived from the acquired image. The term "edge boost record" as used herein refers to a record stored in memory which has both positive and negative boost values for different portions of edge regions in a digital image. As will be described hereinafter, the edge boost record is modified by applying an adaptive blur kernel to the pixels of such edge boost record. The edge boost record and the acquired image are passed to the compute final image block 14 where they are combined to produce a sharpened image. For colored images, the pixels of the edge boost record are added or summed to the pixels of each of the red, green, and blue color records of the acquired image. If the acquired image is black and white, the usual method of combination is just the pixel by pixel addition of the acquired image and the edge boost record.

Figure 5:
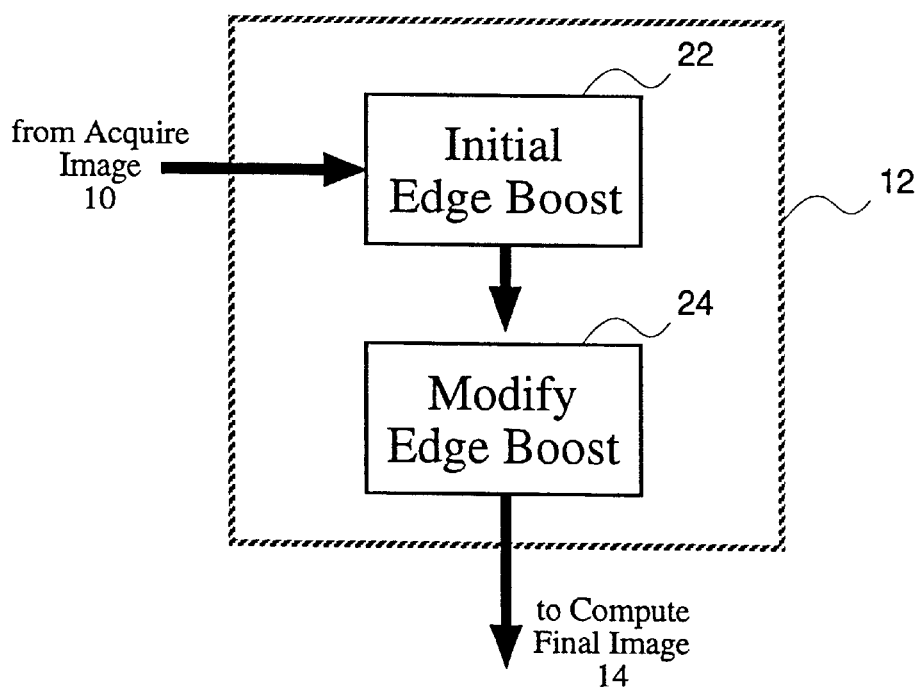
FIG. 5 shows a more detailed block diagram of the compute boost block shown in FIG. 4.

Details of the computer edge boost block 12 are shown in FIG. 5. The initial edge boost block 22 produces an initial edge boost record by conventional means such as by the application of a boost kernel, for example, see FIGS. 2A–2C. The initial edge boost record receives subsequent processing in the modify edge boost block 24. The subsequent processing of the initial edge boost record is an important feature of the present invention.

Figure 1A:
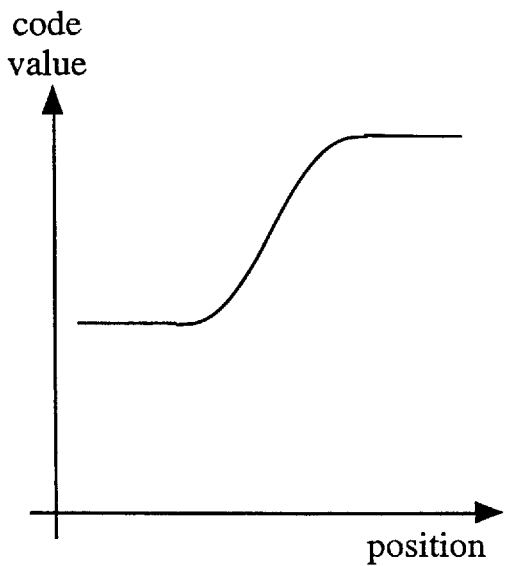
FIG. 1A is a graph of a prior art edge profile of a digital image taken with respect to position vs. code values.
Figure 1B:
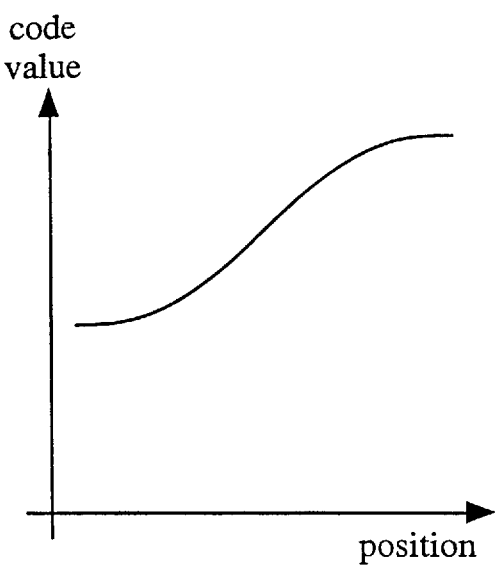
FIG. 1B is the profile of FIG. 1A which has been blurred in the prior process of unsharp masking.
Figure 1C:
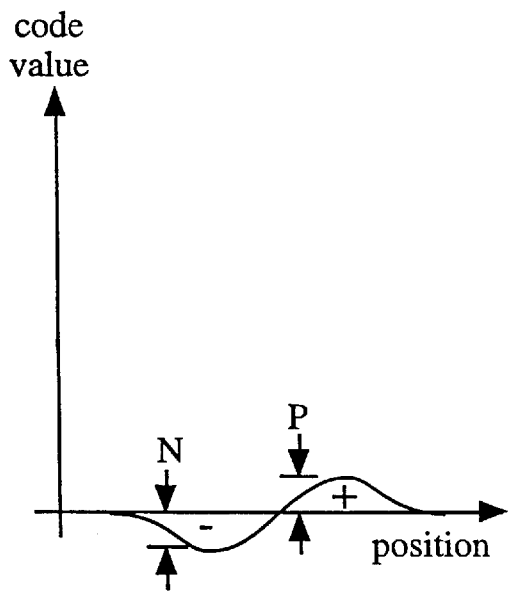
FIG. 1C depicts positive and negative boosts for image sharpening in the prior art.
Figure 1D:
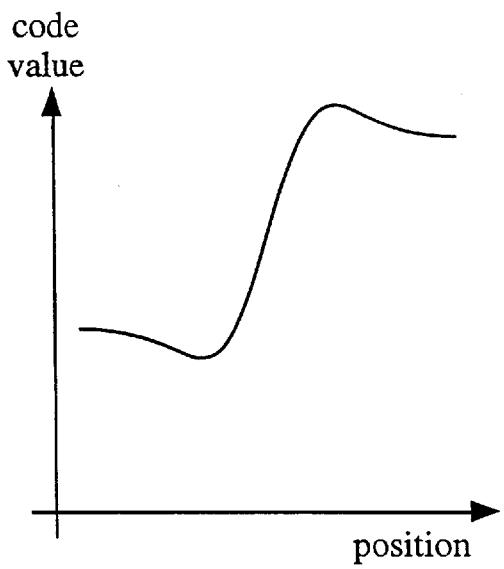
FIG. 1D is a graph depicting the application of the positive and negative boosts of FIG. 1C to the profile shown in FIG. 1A.
Figure 3:
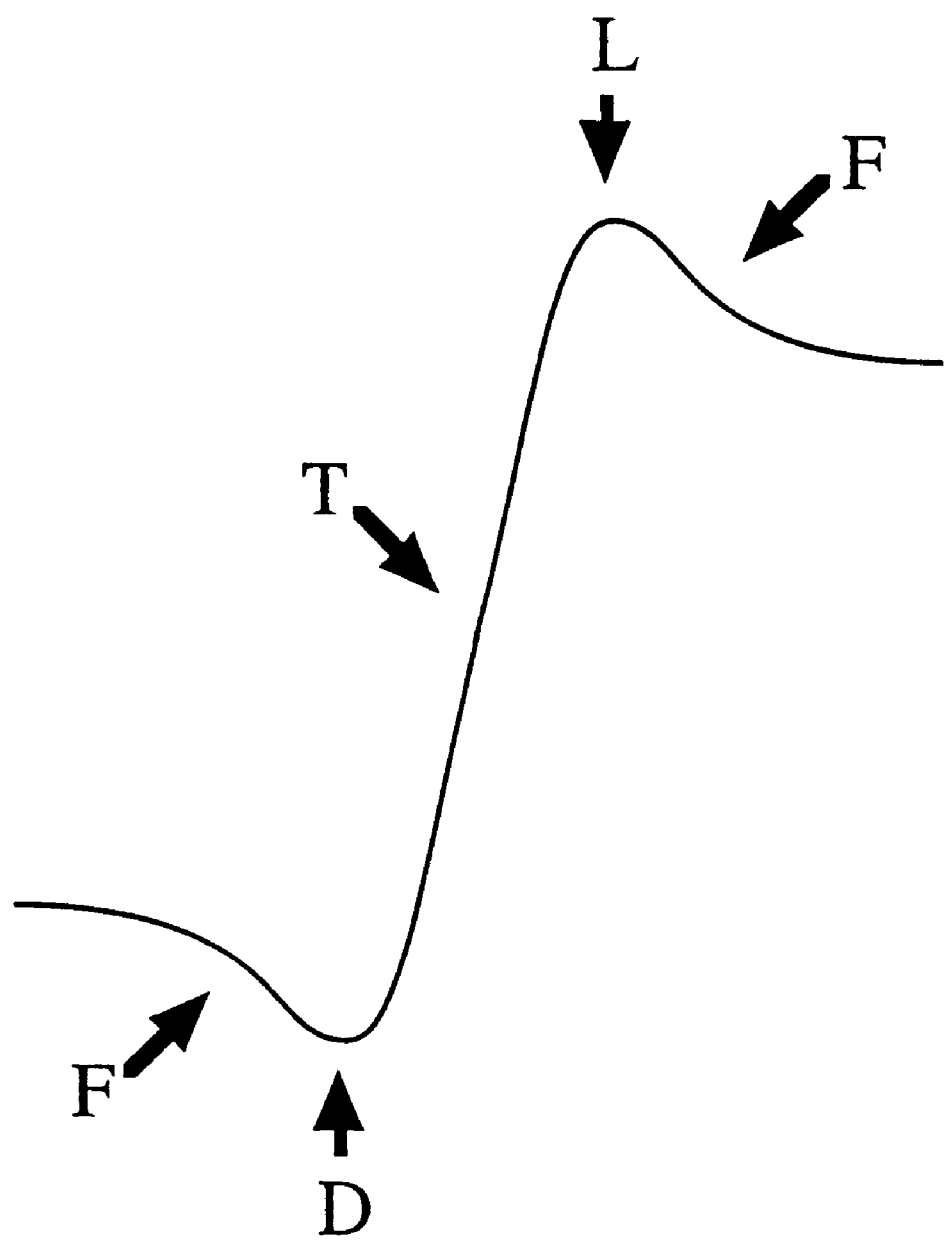
FIG. 3 is a graph which illustrates the position of false contours after an edge has been sharpened.

Edge boost records sharpen images by emphasizing edge features, which is accomplished by making the light side of an edge lighter and the dark side of an edge darker. In doing so, a ridge of lighter pixels is built up on the light side of the edge and a ridge of darker pixels is built up on the dark side of the edge. When applied aggressively, conventional sharpening methods can create false edge contours which cause these ridges to become apparent image features, i.e. image artifacts. When discussing edge enhancement, it is often useful to refer to a one-dimensional edge profile which is a graph of image pixel code values plotted as a function of their position on a line running perpendicularly across an edge feature. The edge profile of an aggressively sharpened edge is shown in FIG. 3 wherein the true edge contour is labeled (T) and the two false edge contours are labeled (F). The resulting light and dark ridges are labeled (L) and (D), respectively.

The present invention uses adaptive smoothing to be applied to the edge boost record such that the true edge contour remains unchanged, but which reduces the contrast of the false contour regions. While the adaptive smoothing may be applied to a pixel neighborhood of any size, it is sufficient to consider 3×3 neighborhoods. The present invention starts with a conventional blur kernel and adaptively modifies its use to achieve the desired result.

Figures 6A, 6B, 7, 8:
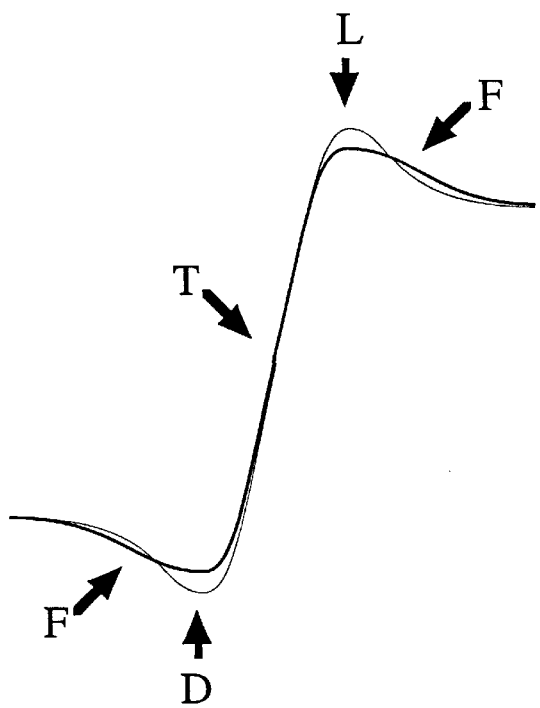
FIGS. 6A–6B show examples of conventional 3×3 blur kernels.
FIG. 7 shows the numbering convention for pixels in a 3×3 neighborhood.
FIG. 8 shows contrast reduction of false edge contours.

Referring to FIGS. 6A–6B, examples of two conventionally used blur kernels are shown (see William K. Pratt, Digital Image Processing, Second Edition, John Wiley & Sons, Inc.). The symbol Bk denotes the value of a conventional blur kernel (B) found in pixel location (k).

FIG. 7 shows the numbering convention for the pixel locations in a 3×3 pixel neighborhood. Each blur kernel also has an associated denomination that equals the sum of all values in the kernel. The denominations associated with the kernels of FIGS. 6A–6B are 9 and 16, respectively. Ek denotes the edge boost value in pixel location (k), the conventional use of blue kernel (B) is to compute:

$$S=(\Sigma Bk \cdot Ek)/(\Sigma Bk)$$

where the summation ($\Sigma$) is understood to be over all pixels in the neighborhood ($1 \leq k \leq 9$). The value S is the new (smoothed) value for the center pixel (position 5) which is stored in a different array from the original Ek values.

Let Wk denote the weights 1 or 0, which is determined by the following rule:

Wk=1 if E5=0, or Ek=0, or Ek and E5 have the same sign

Wk=0 if Ek and E5 have opposite signs In accordance with the present invention, the modified use of blur kernel (B) is to compute $$T=(\Sigma Wk \cdot Bk \cdot Ek)/(\Sigma Wk \cdot Bk)$$

where T is the new (adaptively) smoothed edge boost value for the center pixel (location 5). The same effect is achieved by creating a new 3×3 adaptive blur kernel (A) with values $$Ak=Wk \cdot Bk \text{ (for } 1 \leq k \leq 9)$$

Adaptive blur kernel (A) is then used in the conventional manner (shown above). Both alternatives produce the same numerical result. FIG. 8 shows the effect of the modified edge boost record. The original profile of FIG. 3 is shown in the lighter line, while the adaptively modified profile is shown in the heavier line.

In the event that a pixel neighborhood contains edge boost values of the same sign, or zeros, all the weights (Wk) are 1 and conventional smoothing will occur. This is the case with both false contour regions (F) shown in FIG. 8. The lighter side has positive or zero boost values and the darker side has negative or zero boost value. Thus, both false contours are smoothed and have lower contrast (compare the lighter line with the heavier line). However, at the true edge contour (T) positive and negative boost values are adjacent to each other. If the central pixel has a positive edge boost value, the weights (Wk) are 1 for other positive boost pixels and 0 for adjacent negative boost pixels, thus preventing the negative values from pulling down the neighborhood weighted average. A similar condition holds for a central pixel having a negative edge boost value. As a result, the contrast of the true edge is not diminished (the heavier line and the lighter line coincide).

The process of adaptively smoothing the edge boost record can be applied multiple times, can involve different blur kernels at each step, and can include blur kernels of different sizes. The adaptive weights (Wk) can be computed once and reused in subsequent smoothing steps, or they can be recomputed.

The method of the present invention for enhancing a digital image having pixels can be under the control of a computer program which is stored on a computer readable storage medium. The computer readable storage medium may comprise, for example; magnetic storage media such as magnetic disc (such as a floppy disc) or magnetic tape; optical storage media such as optical disk, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image block
12 compute edge boost block
14 compute final image block
22 initial edge boost block
24 modify edge boost block

What is claimed is:

1. A method of edge enhancing a digital image having pixels which reduces the visibility of false edge contours, comprising the steps of:

a) acquiring a digital image;

b) computing an edge boost record having positive and negative boost values for different portions of the edge regions in a digital image;

c) modifying the edge boost record by applying an adaptive blur kernel to the pixels of said edge boost record by:

(i) providing the blur kernel in response to the boost values of a predetermined number of pixels near the pixel of interest; and (ii) using the geometric pattern of positive and negative boost values in constructing the blur kernel so that only non-negative boost values are used to modify a non-negative boost value, and only non-positive boost values are used to modify a non-negative boost value; and d) applying the modified edge boost record to the digital image to provide an edge enhanced digital image which reduces the visibility of false edge contours.

2. The method of claim 1 wherein the adaptive blur kernel is a function of the edge boost record.

3. The method of claim 1 wherein the adaptive blur kernel is a 3×3 kernel.

4. The method of claim 1 wherein the modified edge boost record is applied to the digital image by summing at each pixel.

5. A computer program product for edge enhancement of a digital image having pixels, comprising a computer readable storage medium having a computer program stored thereon for performing the steps of:

a) acquiring a digital image;

b) computing an edge boost record having positive and negative boost values for different portions of the edge regions in a digital image;

c) modifying the edge boost record by applying an adaptive blur kernel to the pixels of said edge boost record by:

(i) providing the blur kernel in response to the boost values of a predetermined number of pixels near the pixel of interest; and (ii) using the geometric pattern of positive and negative boost values in constructing the blur kernel so that only non-negative boost values are used to modify a non-negative boost value, and only non-positive boost values are used to modify a non-negative boost value; and d) applying the modified edge boost record to the digital image to provide an edge enhanced digital image.

* * * * *